United States Patent [19]

Mabee

[11] Patent Number: 5,389,049

[45] Date of Patent: * Feb. 14, 1995

[54] PRE-ASSEMBLED DISC STACK HAVING PRESET TOLERANCE FOR USE IN DRIVES, BRAKES AND COMBINATIONS THEREOF

[75] Inventor: Brian D. Mabee, Sterling Heights, Mich.

[73] Assignee: Easom Engineering and Manufacturing Corp., Clinton Twp., Macomb County, Mich.

[ * ] Notice: The portion of the term of this patent subsequent to Dec. 22, 2009 has been disclaimed.

[21] Appl. No.: 993,307

[22] Filed: Dec. 18, 1992

Related U.S. Application Data

[63] Continuation-in-part of Ser. No. 846,546, Mar. 5, 1992, Pat. No. 5,242,039.

[51] Int. Cl.$^6$ .................... F16H 37/06; B60K 1/02; F16D 67/06
[52] U.S. Cl. ..................................... 477/4; 477/5; 192/18 B; 192/70.19; 192/70.28; 192/90; 74/625; 74/661; 188/72.3; 188/156; 188/171
[58] Field of Search .............. 192/70.11, 70.13, 70.19, 192/0.02 R, 0.098, 18 R, 18 B, 70.28, 90; 74/661, 625; 188/72.3, 156, 171; 477/4, 5

[56] References Cited

U.S. PATENT DOCUMENTS

| | | | |
|---|---|---|---|
| 987,954 | 3/1911 | Brush | 192/70.2 |
| 1,563,892 | 12/1925 | Clayton et al. | 192/70.19 |
| 2,464,129 | 3/1949 | Goettisheim . | |
| 2,547,137 | 4/1951 | Ochtman . | |
| 2,658,593 | 11/1953 | Doebeli . | |
| 2,840,205 | 6/1958 | Linke . | |
| 3,251,441 | 5/1966 | Winter . | |
| 3,270,265 | 8/1966 | McNulty | 192/1.39 X |
| 3,412,834 | 11/1968 | Root | 192/70.19 X |
| 4,079,820 | 3/1978 | Matli . | |

(List continued on next page.)

FOREIGN PATENT DOCUMENTS 173553 12/1960 Sweden ................ 188/171

OTHER PUBLICATIONS

Oil Shear Electric Brake Brochure of Force Control Ind., Inc., p. 3 Dated Before Jan. 1, 1992.
Spiral Retaining Rings Catalog of Smalley Steel Ring Co., pp. 34 & 35 Dated Before Jan. 1, 1992.
Service Manual of Two-Speed Drive II of Force Control Ind, Inc. pp. 1–4, Dated Apr. 1991.
Warner "Clutches, Brakes and Controls Master Catalog" Dated Before Jan. 1, 1992 of Warner Electric Division of Dana Corp.

*Primary Examiner*—Richard M. Lorence
*Attorney, Agent, or Firm*—Peter D. Keefe

[57] ABSTRACT

A pre-assembled disc stack having a predetermined cross-section within a preset tolerance which is installable and removable as a unit with respect to a drive, brake or a combination thereof, composed of a plurality of annular discs stacked in a prearranged order, in which a first set of annular discs is structured for engaging a first component of a drive, brake or combination thereof, and in which a second set of annular discs is structured for engaging a second component of the clutch, brake or combination thereof which is rotatably mounted with respect to the first component. The first and second sets of annular discs are mutually connected together as a unit by a plurality of alignment pins which pass through circumferentially disposed alignment holes in the second set of annular discs which effectively trap the first set of annular discs with respect to the second set of annular discs in the aforesaid prearranged order. To effect assembly, a plurality of annular discs of the first and second sets of annular discs are provided, each annular disc of each set having a respective predetermined thickness within a respective tolerance which pertains to that set. An alignment pin is placed through each of the circumferentially disposed alignment holes in the second set of annular discs and secured in place, thereby assembling both sets of annular discs into a unit.

25 Claims, 4 Drawing Sheets

U.S. PATENT DOCUMENTS

| | | | |
|---|---|---|---|
| 4,125,178 | 11/1978 | Monks | 192/18 A |
| 4,181,201 | 1/1980 | McCarthy | 188/171 |
| 4,352,415 | 10/1982 | Powell | 188/156 |
| 4,458,794 | 7/1984 | Yater | 192/18 A |
| 4,463,841 | 8/1984 | Kelley | 192/18 A |
| 4,577,738 | 3/1986 | Yater | 192/18 A |
| 4,607,736 | 8/1986 | Kelley | 192/18 A |
| 4,676,356 | 6/1987 | Beccaris et al. | 192/70.28 |
| 4,739,865 | 4/1988 | Yater et al. | 192/18 A |
| 4,765,448 | 8/1988 | Sommer | 192/18 A |
| 4,821,847 | 4/1989 | Langdon et al. | 188/171 |
| 4,890,711 | 1/1990 | Carmillet et al. | 192/90 X |
| 4,921,078 | 5/1990 | Sommer | 188/171 |
| 4,938,321 | 7/1990 | Kelley et al. | 188/171 |
| 5,172,798 | 12/1992 | Mabee | 192/18 B |
| 5,242,039 | 9/1993 | Mabee . | |

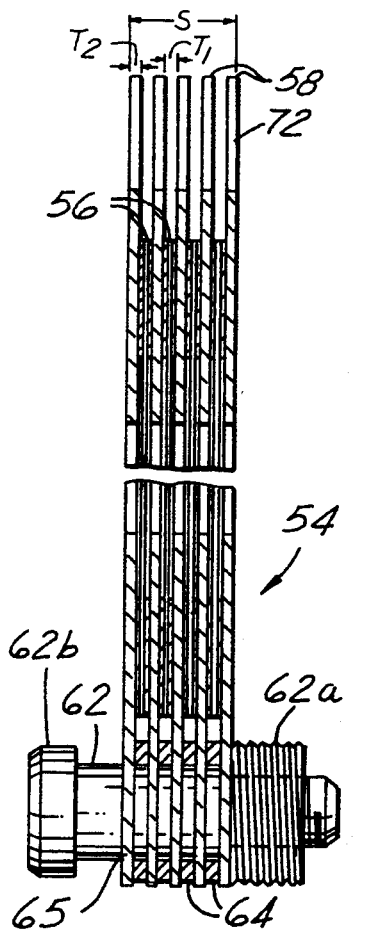
FIG.6
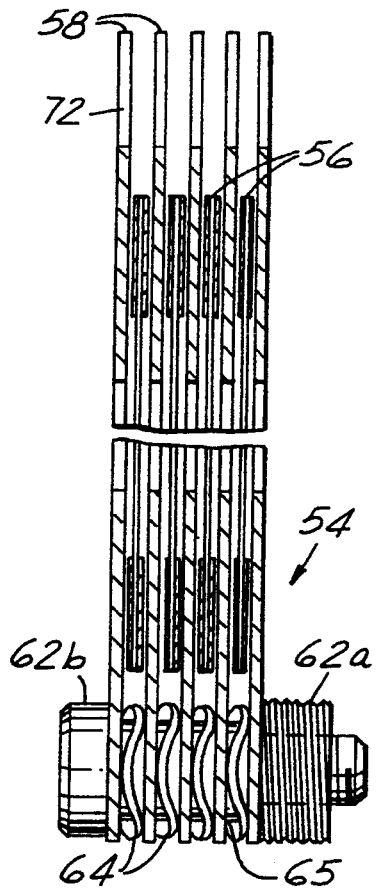
FIG.7
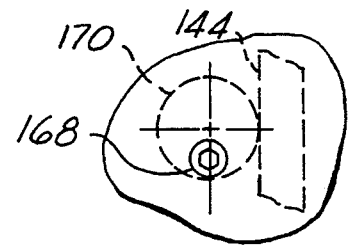
FIG.8
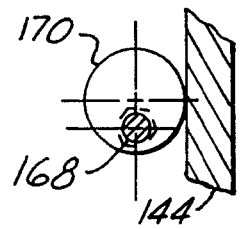
FIG.9
| FUNCTION | SECONDARY COIL | PRIMARY COIL |
|---|---|---|
| STOP | OFF | OFF |
| HIGH SPEED | OFF | ON |
| LOW SPEED | ON | OFF |
FIG.10

PRE-ASSEMBLED DISC STACK HAVING PRESET TOLERANCE FOR USE IN DRIVES, BRAKES AND COMBINATIONS THEREOF

CROSS-REFERENCE TO RELATED APPLICATIONS

The present application is a continuation-in-part application of application Ser. No. 07/846,546, filed on Mar. 5, 1992, now U.S. Pat. No. 5,242,039.

BACKGROUND OF THE INVENTION

1. Field of the invention

The present invention relates to disc stacks used in drives, brakes and combinations thereof utilized in connection with the movement of tooling and other loads which are normally present in manufacturing environments, such as two-speed drives incorporating brake and clutch mechanisms which selectively interface with high and low speed electric motors. More particularly, the present invention relates to oil shear disc stacks pre-assembled to a precise predetermined cross-section within a preset tolerance via a plurality of circumferentially disposed alignment pins. Still more particularly, the present invention relates to oil shear disc stacks of the aforesaid class used in connection with magnetically actuated clutching and/or braking functions in a drive, brake or combination thereof.

2. Description of the Prior Art

Movement of tools and other machinery in manufacturing environments is facilitated by drives which permit both rapid movement and slow movement, coupled with a brake function. Such drives permit rapid job cycling with accurate load positioning, while providing a maximum expected operational life of the drive. Typically, such drives interface with position locating apparatus which convert rotation into translation, such as by a ballscrew apparatus. Drives of this type incorporate two electric motors: a primary drive motor used for rapid movement and a secondary drive motor coupled through a gear reduction unit used for slow movement. These drives further incorporate a brake for precisely stopping movement and a clutch for selectively engaging the primary and secondary drive motors. The clutch is structured in the form of interleaved annular discs of two annular disc sets which collectively form a stack, in which one set of annular discs is attached to a shaft connected with the secondary drive motor, while the other set of annular discs is attached to a shaft connected with the primary drive motor, and a mechanism is used to selectively control clamping pressure between adjacent annular discs. The brake is structured analogously to the clutch, except that one annular disc set is attached to a stationary housing component.

The disc stacks utilized in the brake and clutch rely upon transmission of torque from one set of annular discs to the other set of annular discs. Some systems rely upon dry frictional engagement between adjacent annular discs to provide torque transfer, this is ordinarily considered unacceptable because of excessive wear and tendency for the dry friction material coating the annular discs to inconsistently rub relative to each other, resulting in a "stick-slip" jerking action which makes accurate positioning almost impossible to achieve. Systems which rely on dry frictional engagement between the annular disc sets generally are those which utilize low clamping force actuation systems, such as those which are electromagnetically operated. Accordingly, most conventional systems rely upon disc stacks utilizing an oil shear principle, in which adjacent annular discs brought into proximity by a clamping actuator, such as a pneumatic device, mutually transmit torque by a thin film of oil therebetween due to viscous shear of the oil film. The oil serves to reduce annular disc wear, provides consistent force transmission and conducts away waste heat. Accordingly, oil shear operated disc stacks have become industry standard, although there is involved a high degree of cost and installation complexity.

An example of a conventional two-speed drive is described in U.S. Pat. No. 4,463,841 to Kelley, dated Aug. 7, 1984. In this drive, a secondary electric motor drives through a gear reducer to an input shaft which connects with a clutch. The clutch is composed of an oil shear operated disc stack, in which one annular disc set is connected with the input shaft and the other annular disc set, interleaved with the first annular disc set, is connected with an output shaft. The output shaft connects with a primary electric motor, which, in turn, provides an output shaft for the drive. The output shaft interfaces with a brake composed of a second oil shear operated disc stack, in which one annular disc set is connected with the output shaft and the other annular disc set, interleaved with the first, is connected with the housing. A pneumatically operated bi-directional piston is axially moved to selectively apply annular disc clamping pressure to either the clutch disc stack or the brake disc stack. In the former mode, the secondary electric motor is able to drive the output shaft, while in the latter mode, rotation of the output shaft is braked. In the neutral position of the bi-directional piston, the brake is off, the secondary electric motor unconnected, and the primary electric motor is used as the prime mover. Selective movement of the bi-directional piston in concert with selective actuation of the electric motors enables an operator to achieve rapid and precise relocation of a load.

While the drive described in U.S. Pat. No. 4,463,841 operates acceptably in many situations, it has several significant problems which have been only partly addressed in the prior art.

One problem is that in the event of a power or fluid pressure failure, it is possible for the drive to continue spinning without the benefit of a brake. This problem was at least partly solved by a drive described in U.S. Pat. No. 4,607,736 to Kelley, dated Aug. 26, 1986, in which the brake stack is normally clamped by biasing action of springs on the bi-directional piston, and which biasing action is overcome as long as fluid pressure is maintained in the pneumatic lines. This solution pertains, accordingly, only to pressurized fluid operated brake systems.

Another problem is that an external supply of pressurized fluid must be provided to actuate the bi-directional piston. This problem was solved by a drive described in U.S. Pat. No. 4,739,865 to Yater et al, dated Apr. 26, 1988, which discloses a drive incorporating clutch and brake components as generally described above and further incorporating a self-contained hydraulic pump system for actuating the bi-directional piston that controls clamping of the disc stacks. Accordingly, this drive eliminates the need for an external pressurized fluid source. However, this drive has the added costs of an internally provided pressurized fluid source, and it is not suited for use in two speed drives as it requires a motor to be running at the input shaft in order to actuate the bi-directional piston.

It is clear that electromagnetic actuation systems for oil shear disc stacks have superior performance characteristics, less installation cost and less maintenance cost over air actuated systems. However, a disc stack operating via an electromagnetic actuation system is far more sensitive to the need for being built according to a preset tolerance in order for the armature of the electromagnetic actuation system to properly regulate clamping of the disc stack. The standard technique used in the art for providing what is an analogous equivalent of a disc stack having a predetermined cross-section within a preset tolerence is to assemble the annular discs of the disc stack, then utilize shims to offset the effect of annular disc thickness variations, the accumulation of which exceeds, above or below, the preset tolerance of the disc stack cross-section necessary for the magnetic actuation system to function as originally designed. This situation is vastly exacerbated when the oil shear disc stack requires field servicing due to failure or wear. A technician who replaces components of the stack is working on best guess estimates as to the disc stack cross-section after re-assembly. In all likelihood, the reconditioned disc stack will fail because it is operating outside the preset tolerance of cross-section for optimum operational performance and life.

Accordingly, what remains needed in the art is a pre-packaged disc stack, particularly of the oil shear variety, having factory determined preset tolerance of cross-section which is easily installed as a unit at the factory into a drive, brake or a combination thereof, or, in the field, is easily removed as a unit from the drive, brake or combination thereof followed by a new pre-packaged disc stack of the class aforesaid being installed as a unit.

SUMMARY OF THE INVENTION

The present invention is a pre-assembled disc stack having a cross-section within a preset tolerance which is installable and removable as a unit with respect to a drive, brake or a combination thereof.

The disc stack according to the present invention is composed of a plurality of annular discs stacked in a prearranged order, in which a first set of annular discs is structured for engaging one component of a drive, brake or combination thereof, and in which a second set of annular discs is structured for engaging another component of the clutch, brake or combination thereof which is rotatably mounted with respect to the first component. The first and second sets of annular discs are mutually connected together as a unit by a plurality of alignment pins which pass through circumferentially disposed alignment holes in the second set of annular discs which effectively trap the first set of annular discs with respect to the second set of annular discs in the aforesaid prearranged order.

According to the method of the present invention for providing a pre-assembled disc stack having a predetermined cross-section within a preset tolerance, a plurality of annular discs of the first and second sets of annular discs are provided, each annular disc of each set having a respective predetermined thickness within a respective tolerance which pertains to that set. The annular discs are sequentially stacked according to the prearranged order, wherein particular annular discs are selected having a known thickness so that the cumulative total cross-section of the stacked annular discs is within a preset tolerance for the cross-section of the disc stack. Next, an alignment pin is placed through each of the circumferentially disposed alignment holes in the second set of annular discs and secured in place, thereby assembling both sets of annular discs into a unit.

Accordingly, it is an object of the present invention to provide a pre-assembled disc stack having a predetermined cross-section within a preset tolerance.

It is an additional object of the present invention to provide a pre-assembled disc stack having a predetermined cross-section within a preset tolerance, wherein the annular discs thereof are stacked in a prearranged sequence of first and second sets and each of the annular discs of each set is provided with a thickness within one or more predetermined tolerance that pertains to that set.

It is another object of the present invention to provide a pre-assembled disc stack having a predetermined cross-section within a preset tolerance, wherein the annular discs thereof are stacked in a prearranged sequence of first and second sets, and wherein the second set of annular discs are provided with circumferentially disposed alignment holes for receiving alignment pins which serve to hold the annular discs of each set together as a unit.

It is yet an additional object of the present invention to provide a pre-assembled disc stack having a predetermined cross-section within a preset tolerance, wherein the annular discs thereof are stacked in a prearranged sequence of first and second sets and each of the annular discs of each set is provided with a thickness within a tolerance pertaining to that set, wherein the annular discs are structured for operation according to the oil shear principle.

It is yet another object of the present invention to provide a pre-assembled disc stack having a predetermined cross-section within a preset tolerance, wherein the annular discs thereof are stacked in a prearranged sequence of first and second sets and each of the annular discs of each set is provided with a thickness within a predetermined tolerance that pertains to that set, wherein the disc stack is used with respect to an electromagnetic actuation system.

It is still another object of the present invention to provide a pre-assembled disc stack having a predetermined cross-section within a preset tolerance, wherein the annular discs thereof are stacked in a prearranged sequence of first and second sets and each of the annular discs of each set is provided with a thickness within a predetermined tolerance that pertains to that set, wherein the disc stack is used in a clutch, a brake, or a combination thereof.

These, and additional objects, advantages, features and benefits of the present invention will become apparent from the following specification.

1 and showing in particular the primary drive assembly and the clutch assembly.

Figure 2:
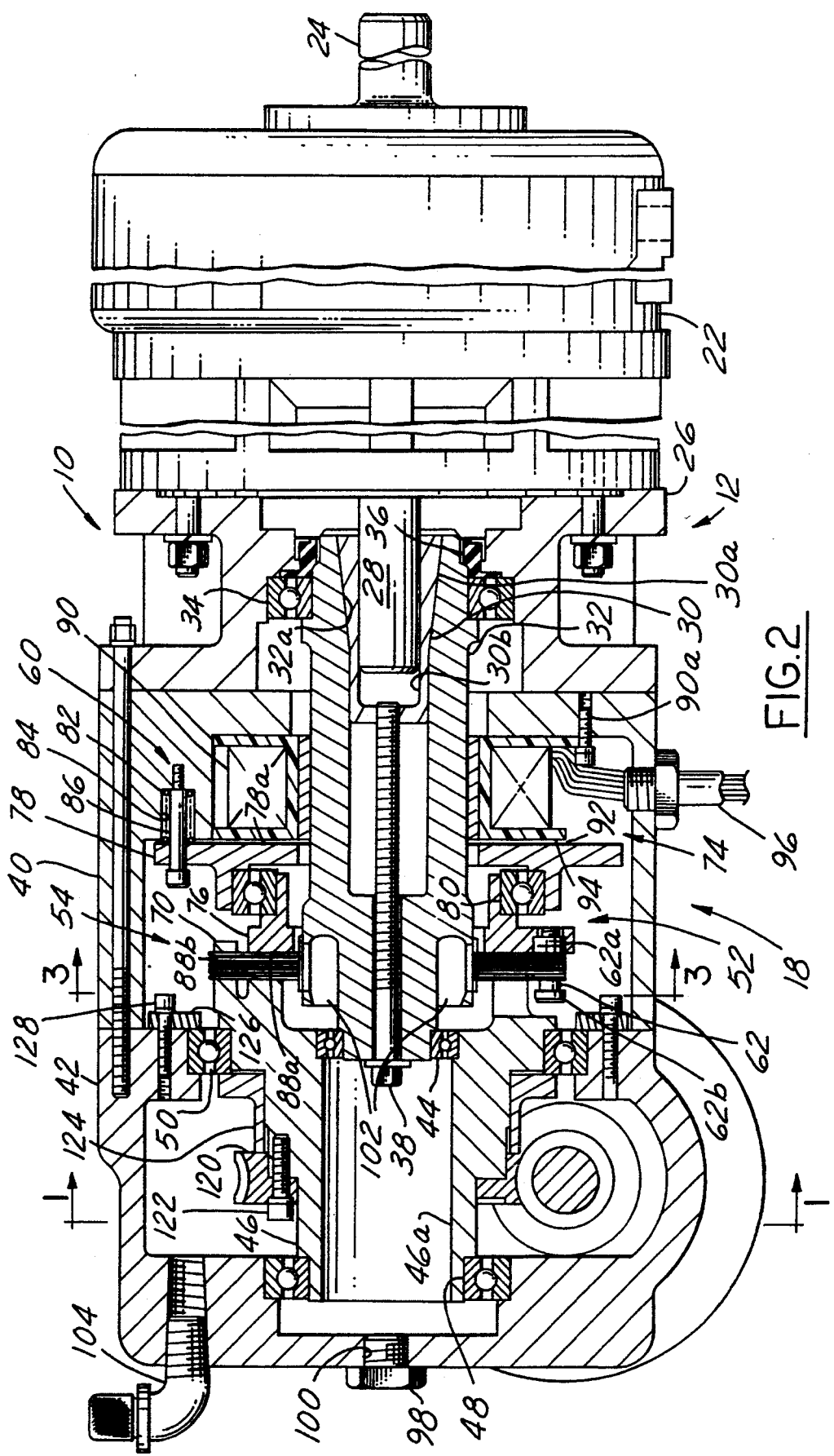
FIG. 2 is a partly sectional side view, detecting the pre-assembled disc stack according to the present invention shown in operation with respect to the clutch portion of a two-speed drive, seen along lines 2—2 in FIG.
Figure 3:
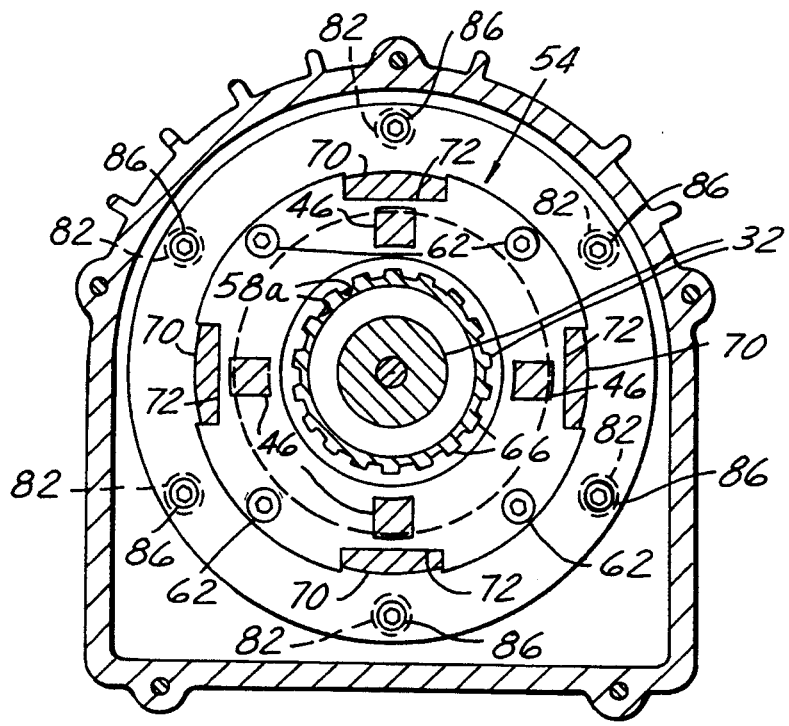

FIG. 3 is a partly sectional end view of the two-speed drive, seen along lines 3—3 in FIG. 2 and showing in particular the pre-assembled disc stack according to the present invention.

Figure 4:
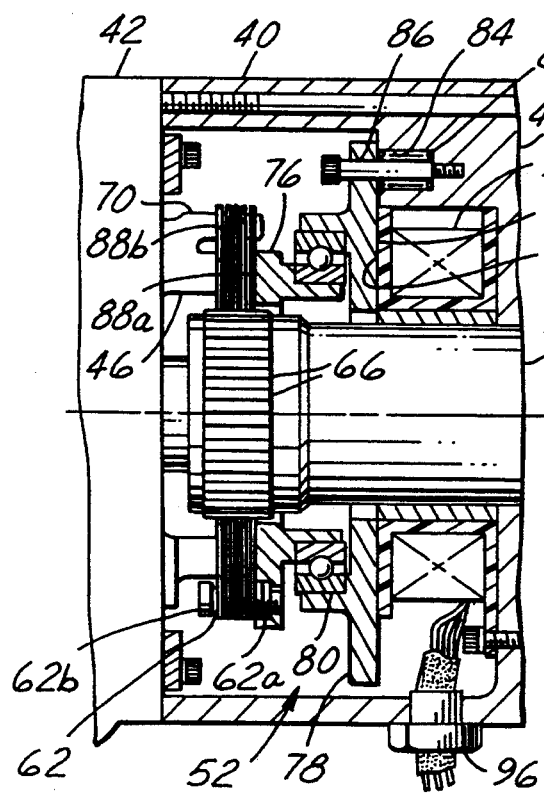

FIG. 4 is a detail partly sectional side view of the two-speed drive, showing in particular the pre-assembled disc stack from the same vantage as that of FIG. 2.

Figure 5:
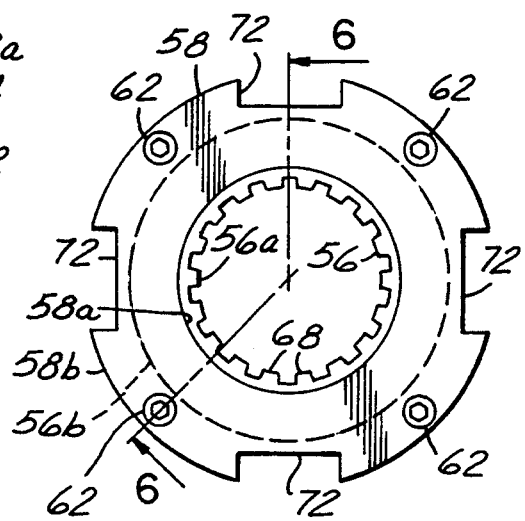

FIG. 5 is a detail plan view of an annular disc of the pre-assembled disc stack as seen from e vantage as that of FIG. 3.

FIG. 6 is an edge view of the pre-assembled disk stack shown in FIG. 4, seen along lines 6—6 in FIG. 5, in which the pre-assembled disk stack is in a clamped mode.

FIG. 7 is an edge view of the pre-assembled disk stack shown in FIG. 6, now showing the pre-assembled disk stack is in an unclamped mode.

Figure 1:
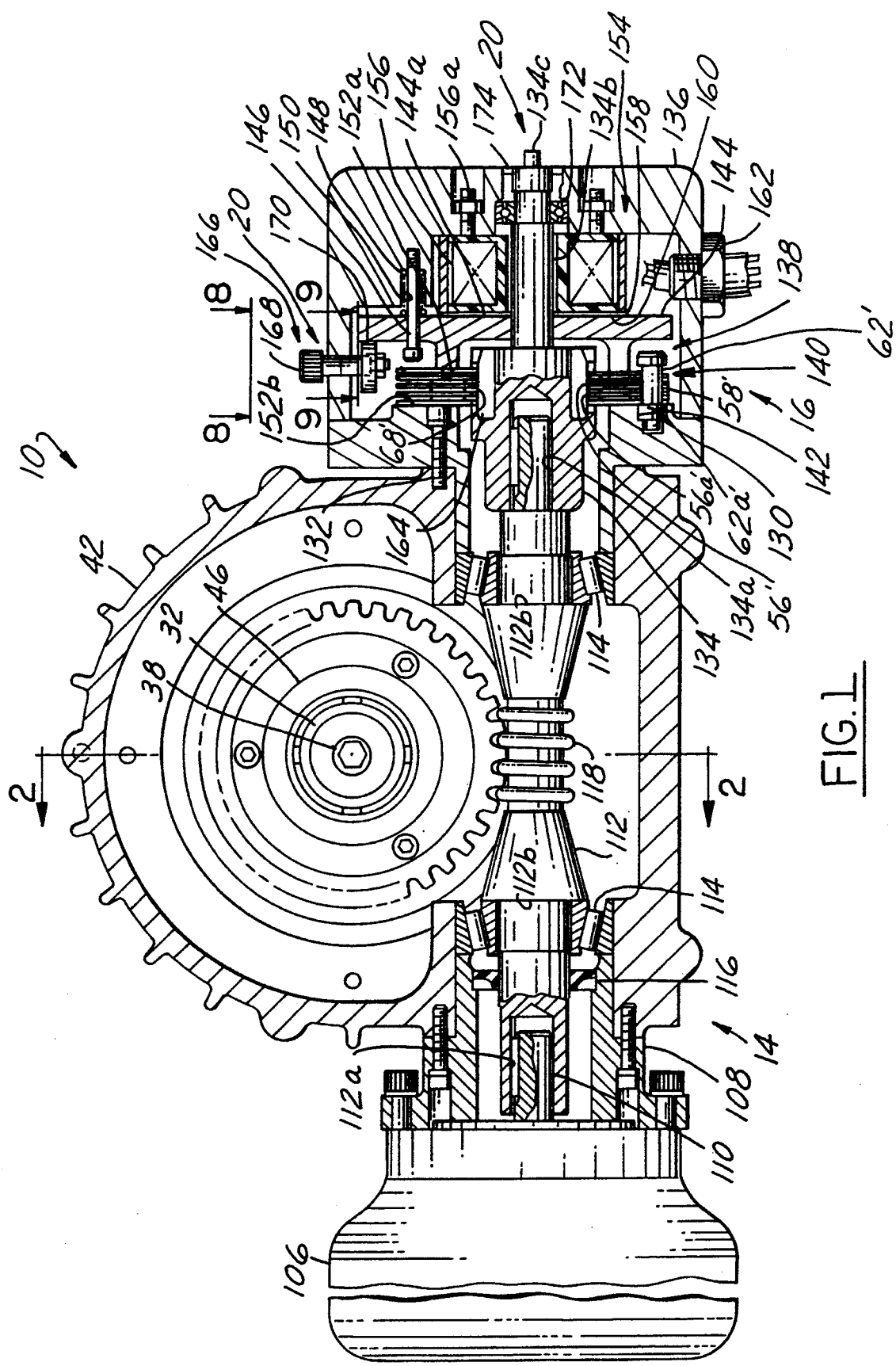
FIG. 1 is a partly sectional end view showing the pre-assembled disc stack according to the present invention, shown in operation with respect to the brake portion of a two-speed drive, seen along lines 1—1 in FIG. 2 and detecting in particular the secondary drive assembly and the brake assembly.

FIG. 8 is plan view of a manual over-ride assembly for the two-speed drive, seen along lines 8—8 in FIG. 1.

FIG. 9 is a partly sectional plan view of the manual over-ride assembly seen along lines 9—9 in FIG. 1.

FIG. 10 is a schematic diagram of electrical functions with respect to actuation of the primary and secondary drive motors and the primary and secondary electromagnetic coils of the two-speed drive.

DETAILED DESCRIPTION OF THE PREFERRED EMBODIMENT

As indicated hereinabove, the present invention is a pre-assembled disc stack having a predetermined cross-section within a preset tolerance which is installable and removable as a unit with respect to a device in the form of a drive, brake or a combination thereof. In order to fully understand the structure and function of the pre-assembled disc stack according to the present invention, installation and operation with respect to a two-speed drive will be elaborated as an exemplary environment of operation.

Referring now to the Drawing, a general over-view of a two-speed drive 10 according to the present invention can be understood with reference being had to FIGS. 1 and 2. The two-speed drive 10 is composed of a primary drive assembly 12 for providing high speed driving, a secondary drive assembly 14 for providing low speed driving, a normally engaged brake assembly 16 for providing controlled stopping, and a normally engaged clutch assembly 18 for providing selective engagement between the secondary drive assembly and the brake assembly with respect to the primary drive assembly. The primary drive assembly 12 directly provides rapid positional movement, with braking achieved by engagement of the clutch assembly 18 and the brake assembly 16. The secondary drive assembly 14 provides slow positional movement driven through the clutch assembly 18, with braking achieved by engagement of the brake assembly 16. Both the clutch assembly 18 and the brake assembly 16 operate on the oil shear principle, and are structured to be actuated selectively by energization of respective electromagnetic coils. The brake assembly 16 is connected with a manual over-ride assembly 20 for providing manual driving for purposes of set-up or in the event of a power failure.

A. The Primary Drive Assembly

The primary drive assembly 12 includes a primary drive motor 22 of a standard electric type, preferably three-phase and operating at approximately 1,725 RPM.

The primary drive motor 22 has, at one side thereof, an external drive shaft 24 for interfacing with an external position movement apparatus (not shown) such as a ballscrew apparatus. The opposite side of the primary drive motor 22 is fastened to an adapter housing 26 for rigidly securing the primary drive motor with respect to the two-speed drive 10. Energization of the primary drive motor 22 provides direct high speed drive of the position movement apparatus.

B. The clutch Assembly

The clutch assembly 18 will now be detailed. The opposite end of the primary drive motor is provided with a primary drive shaft 28. A collet 30 having a gently tapered outside surface 30a with slots cut out radially from the center to the outside surface, has an axial bore 30b into which the primary drive shaft 28 press fits. The collet 30 fits into a tapered seat 32a provided in one end of a primary clutch shaft 32. The primary clutch shaft 32 is rotatably mounted with respect to the adapter housing by a first primary clutch shaft bearing 34; adjacent thereto is an oil seal 36 therebetween. A collet bolt 38 extends through the primary clutch shaft 32 from the opposite end thereof and threadably engages with the collet 30. Tightening of the collet bolt 38 results in the collet being drawn into and compressed by the tapered seat 32a, thereby clamping it with respect to the drive shaft 28. Loosening of the collet bolt 38 permits undamaged disassembly.

The adapter housing 26 is connected with a clutch assembly housing 40, which is, in turn, connected with a secondary drive housing 42. The opposite end of the primary clutch shaft 32 is rotatably supported on a second primary clutch shaft bearing 44. The second primary clutch shaft bearing 44 engages an axial bore 46a in a secondary clutch shaft 46, and is useful to provide axial location of the primary clutch shaft 32 so as to facilitate assemblage of the clutch assembly prior to installation of the primary drive motor 22. The secondary clutch shaft 46 is rotatably connected at one end to the secondary drive housing 42 by a radial support bearing 48, and is further connected to the secondary drive housing at an intermediate location by a four point contact bearing 50 which is able to take axial thrust loads generated by clutch springs (which are discussed hereinbelow).

The primary clutch shaft 32 is selectively connected with the secondary clutch shaft 46 through a clutch 52. The clutch 52 operates on the oil shear principle, and is composed of a pre-assembled disc stack 54 having a first set of annular discs 56 which are interleaved with a second set of annular discs 58, the two sets of annular discs being unclamped by selective energization of an electromagnetic coil assembly 60. The annular discs of the pre-assembled disc stack 54 are of a composition, shape and surface finish well known in the art of oil shear torque transfer.

The pre-assembled disc stack 54 is held together as a unit by a plurality of axially protecting and circumferentially disposed alignment pins 62. In this regard, the second set of annular discs 58 is provided with a plurality of alignment holes 65 through which the alignment pins pass. The annular discs of each set 56, 58 are stacked in a pre-arranged sequence. A wave washer 64 is preferred, but not required, to be placed between each of the annular discs of the second set 58. Upon completion of this stacking process, a double threaded nut 62a is threaded onto an end of each of the alignment pins 62; it is preferred for a thread lock adhesive to be used to assure that the double threaded nuts 62a remain permanently threaded at a desired location on the alignment pins 62. Accordingly, both sets of annular discs 56, 58 are trapped between a head 62b at one end of each of the alignment pins 62 and the double threaded nut 62a at the other end of each of the alignment pins. Of course, other configurations for the alignment pins are possible, so long as they are arranged and structured to interact abutably with the annular discs in a manner that holds the pre-assembled disc stack 54 together as a unit.

With added specificity according to the method of the present invention for providing a pre-assembled disc stack of predetermined cross-section within a preset tolerance, a plurality of annular discs used for the first and second sets of annular discs 56, 58 are provided, each annular disc of each set having a respective predetermined thickness within a respective tolerance which pertains to that set. For example, annular discs of the first set 56 each have a first predetermined thickness $T_1$ having a tolerance of plus or minus 0.002 inch, and annular discs of the second set 58 each have a second predetermined thickness $T_2$ having a tolerance of plus or minus 0.003 inch. The annular discs of the first and second sets 56, 58 are sequentially stacked according to the prearranged order, wherein particular annular discs are selected having known thicknesses so that the cumulative total cross-section of the stacked discs (see FIG. 6) is within a preset tolerance of a predetermined cross-section S of the pre-assembled disc stack 54. That is in this example, the cumulative cross-section of the disc stack is equal to the first predetermined thickness $T_1$ plus or minus a selected thickness variation within the preset tolerance limit therefor times the number of annular discs in the first set 56, plus the second predetermined thickness $T_2$ plus or minus a selected thickness variation within the preset tolerance limit therefor times the number of annular discs in the second set 56. It is to be noted that at least one thickness and at least one preset tolerance may be applicable to the annular discs of each set of the pre-assembled disc stack 54. Next, an alignment pin 62 is placed, respectively, through each of the circumferentially disposed alignment holes 65 in the second set of annular discs 58 and secured in place, respectively, by the double threaded nuts 62, thereby assembling as a unit both sets of annular discs 56, 58 into the pre-assembled disc stack 54.

The pre-assembled disc stack 54 is structured to engage the primary and secondary clutch shafts 32, 46, and the first and second sets of annular discs 56, 58 are respectively axially slidable therewith. In this regard, the primary clutch shaft 32 is provided with splines 66 which engage teeth 68 on the inner periphery 56a of the first set of annular discs 56 (the cross-section of the inner periphery 58a of the second set of annular discs 58 being greater than that of the aforesaid inner periphery 56a, as shown in FIG. 5). In this regard further, the secondary clutch shaft is provided with a plurality of axially oriented lugs 70 which are structured to engage similarly dimensioned notches 72 on the outer periphery 58b of the second set of annular discs 58 (the cross-section of the outer periphery 56b of the first set of annular discs 56 being less than that of the aforesaid outer periphery 58b, as shown also in FIG. 5). See FIGS. 3 through 7, wherein FIGS. 5, 6 and 7 show the general structure of the pre-assembled disc stack and FIGS. 3 and 4 show placement thereof with respect to the primary and secondary clutch shafts 32, 46.

As indicated above, the annular discs composing the pre-assembled disc stack 54 are selectively clamped together to thereby couple the primary clutch shaft 32 with respect to the secondary clutch shaft 46. In this regard, each of the double threaded nuts 62a threadably engage a clutch thrust plate 76. The clutch thrust plate 76, which rotates with the secondary clutch shaft 46, is connected to a non-rotating clutch armature plate 78 via a four-point contact bearing 80. A plurality of clutch springs 82 are seated within clutch spring cavities 84 located in the clutch assembly housing 40. The clutch springs 82 bias against the clutch armature plate 78, causing the clutch thrust plate 76 to bias against the pre-assembled disc stack 54. Axial movement of the clutch armature plate 78 in response to the biasing of the clutch springs 82, is regulated by shoulder bolts 86 which slidably engage the clutch armature plate and emanate anchorably from each of the clutch spring cavities 84. Clamping force between the two sets of annular discs 56, 58 is supplied by the biasing action of the clutch springs 82 evenly pressing a first thrust surface 88a on the clutch thrust plate 76 toward a second thrust surface 88b on the secondary clutch shaft 46.

Normally, the two sets of annular discs 56, 58 are clamped together by the biasing of the clutch springs 82. Accordingly, normally the secondary clutch shaft 46 is engaged with respect to the primary clutch shaft 32. In order that this engagement be user selectable, a clutch electromagnetic coil assembly 60 is provided. The clutch electromagnetic coil assembly 60 is composed of a primary electromagnetic coil 90 which is axially located within and connected by mounting bolts 90a to the clutch assembly housing 40 so that the clutch assembly housing serves as a heat sink for the primary electromagnetic coil. A working air gap 92 is provided between the pole 94 of primary electromagnetic coil 90 and a coil face portion 78a of the clutch armature plate 78, which is constructed of a magnetic material. Upon energization of the primary electromagnetic coil 90, the clutch armature plate 78 is magnetically attracted thereto and moves axially toward the pole 94, the biasing force of the clutch springs being overcome. Since the four-point contact bearing 80 and the clutch thrust plate 76 move with the clutch armature plate 78, the clamping force being applied to the pre-assembled disc stack 54 by the clutch springs 82 is relieved. Accordingly, the secondary clutch shaft 46 becomes disengaged from the primary clutch shaft 32. In this respect, the working gap 94 and the necessary amount of inter-disc distance are predetermined with respect to the preset tolerance of the predetermined cross-section of the pre-assembled disc stack 54 so that the two sets of annular discs 56, 58 are rotatively independent when the primary electromagnetic coil 90 is energized. An electric feed 96 is provided through the clutch assembly housing 40 to provide connection of the primary electromagnetic coil 90 to a source of electricity.

Oil is filled within clutch assembly 18 via a removable threaded filler/sight cap 98 which threads into a filler hole 100 through the secondary drive housing 42, and located in axial alignment with the primary clutch shaft 32. Oil is filled through the filler hole 100 with the clutch assembly 18 in a tilted orientation. Oil level is indicated through a sight in the filler/sight cap 98. In order to ensure proper oil flow between the annular discs of the pre-assembled disc stack 54, a centrifugal oil pump 102 is provided on the primary clutch shaft 32 adjacent the splines 66. A breather 104 is provided in the secondary drive housing 42 for keeping atmospheric pressure within the clutch assembly 18; excessive pressure can lead to oil seal failure, and therefore is to be avoided. Oil is circulated around the primary electromagnetic coil 90 to assist heat dissipation. Due to the use of oil, throughout the two-speed drive 10, oil seals and gaskets between housing components are utilized to prevent oil leaks.

The pre-assembled disc stack 54 utilized in the clutch assembly 18 has a number of significant advantages.

First, pre-assembly of the disk stack by operation of the alignment pins 62 assures a proper order and selection of the annular discs and a preset tolerance of the cumulative cross-section of the disk stack. The preset tolerance is critical so that the working air gap 92 is minimized and operation is trouble free over a long operational life; disc order and disc selection is also critical to allowing the pre-assembled disc stack 54 to be held as tightly as possible per the preset tolerance of the predetermined cumulative cross-section of the disc stack. A more tightly held disc stack results in a minimization of the clutch electromagnetic coil assembly 60, since the force exerted by the primary electromagnetic coil 90 on the clutch armature plate 78 is inversely proportional to the square of the distance the clutch armature plate must travel.

Second, assemblage is simplified and made much less susceptible to error since the disk stack is a pre-assembled package. There is no possibility for annular disc order mistake or the cumulative cross-section of the disc stack exceeding tolerance. In this regard, the pre-assembled disc stack 54 is placed as a whole within the clutch 52 and then the teeth 68 of the first set of annular discs 56 are slipped on the splines 66 of the primary clutch shaft 32. Upon completion, the double threaded nuts 62a are threaded into the clutch thrust plate 76. Next, the secondary clutch shaft 46 is located with the lugs 70 engaging the notches 72 on the second set of annular discs 58; in this regard, the first clutch thrust surface 88a is useful to help alignment of the annular discs. The shoulder bolts 86 capture the clutch armature plate 78, clutch thrust plate 76, the four point contact bearing 80 and the clutch springs 82, so that these can be assembled as a sub-assembly.

Third, the alignment pins 62 permit the use of the wave washers 64 between each of the annular discs of the first set of annular discs 56. The wave washers are important to help reduce adjacent annular disc dragging caused by surface tension of the oil. Further, the wave washers he to ensure even wear across adjacent surfaces of the annular discs.

Torque transfer between the two sets of annular discs 56, 58 can be varied per particular application of the two speed drive 10 by providing clutch springs 82 having a certain preselected spring constant. Further, the pre-assembled disc stack 54 may be configured as desired, such as two or more annular discs of the same set being mutually adjacent rather than being alternately sequentially stacked throughout the disc stack.

C. The Secondary Drive Assembly

The secondary drive assembly 18 includes a secondary drive motor 106 connected to a C-face adapter 108, the C-face adapter being connected with the secondary drive housing 42. The secondary drive motor 106 is preferred to be a three phase electric motor, and may have the same ratings as the primary drive motor 22; typically, however, the secondary drive motor will have a lower horsepower rating than the primary drive motor. A secondary drive shaft 110 of the secondary drive motor 106 is keyed to engage with a keywayed bore 112a of a worm shaft 112. The worm shaft 112 is rotatably supported with respect to the secondary drive housing 42 by a pair of support bearings 114 which axially affix the worm shaft. An oil seal 116 is located between the secondary drive shaft 110 and the C-face adapter 108. The worm shaft 112, at an intermediate position between the support bearings 114, is provided with a spiral worm 118.

A worm gear 120 is connected to the secondary clutch shaft 46 at an intermediate position between the radial support bearing 48 and the four point support bearing 50 by a plurality of worm gear bolts 122 and reamed dowels. A spacer ring 124, which axially affixes the four point support bearing 50, is clamped by the worm gear 120. The worm gear 120, the spacer ring 124, the bearings 48, 50, and the secondary clutch shaft 46 are captured by a retainer ring 126 via a plurality of ring bolts 128; accordingly, these components may be assembled as a sub-assembly. The worm gear 120 gearably engages the worm 118 so that energization of the secondary drive motor 106 results in the worm driving the secondary clutch shaft 46.

D. The Brake Assembly

The brake assembly 16 includes a brake mounting plate 130 which is connected to the secondary drive housing 42 by a plurality of bolts 132. The support bearings 114 are axially trapped by respectively adjacent shoulders 112b on the worm shaft 112 in combination with the C-face adapter 108 and the brake mounting plate 130. The worm shaft 112, opposite the secondary drive motor 106, is keyed for engagement with a keywayed bore 134a of a brake hub 134. A brake housing 136 is connected with the brake mounting plate 130.

The worm shaft 112 is selectively stopped through operation of a brake 138 connected with the worm shaft 112 and the stationary housing components of the two-speed drive 10. As in the clutch 52, the brake 138 operates on the oil shear principle, and is composed of a second pre-assembled disc stack 140 having the specifications detailed hereinabove with respect to the previously detailed pre-assembled disc stack 54. Accordingly, for the sake of brevity, the same numerals with a prime are used to show like functioning components as between the pre-assembled disc stack 54 and the second pre-assembled disc stack 140. In this regard, it is important to note that the second pre-assembled disc stack 140 is also pre-assembled using a plurality of axially projecting and circumferentially disposed alignment pins 62'.

The second pre-assembled disc stack 140 is structured to engage the worm shaft 112 and the non-rotating housing components, namely the brake mounting plate 130, and the first and second sets of annular discs 56', 58' are respectively axially slidable therewith. In this regard, the brake hub 134 is provided with splines 140 which engage teeth 68' on the inner periphery 56a' of the first set of annular discs 56'. In this regard further, the brake mounting plate 130 is provided with threaded seats 142 for threadably receiving the double threaded nuts 62a' of the alignment pins 62'. In this way, the second set of annular discs 58' are held rotatively fixed with respect to the brake mounting plate 130.

The brake 138 is actuated by the annular discs composing the second pre-assembled disc stack 140 being selectively clamped together to thereby couple the worm shaft 112 to the brake mounting plate 130. In this regard, a brake armature plate 144, is slidably supported and guided by a plurality of shoulder bolts 146, analogously as in the clutch 52, which emanate anchorably from brake spring cavities 150 in the brake housing 136. A brake spring 148 is seated within each of the brake spring cavities 150. The brake springs 148 bias against the brake armature plate 144, causing it to bias against the second pre-assembled disc stack 140. Clamping force between the two sets of annular discs 56', 58' is supplied by the biasing action of the brake springs 148 evenly pressing a first brake thrust surface 152a on the brake armature plate 144 toward a second brake thrust surface 152b on the brake mounting plate 130.

Normally, the two sets of annular discs 56', 58' are clamped together by the biasing of the brake springs 148. Accordingly, normally the worm shaft 112 is engaged with respect to the stationary housing components, via the brake mounting plate 130. In order that this engagement be user selectable, a brake electromagnetic coil assembly 154 is provided. The brake electromagnetic coil assembly 154 is composed of a secondary electromagnetic coil 156 which is axially located within and connected by mounting bolts 156a to the brake housing 136 so that the brake housing serves as a heat sink for the secondary electromagnetic coil. A working air gap 158 is provided between the pole 160 of the secondary electromagnetic coil 156 and a coil face portion 144a of the brake armature plate 144, which is constructed of a magnetic material. Upon energization of the secondary electromagnetic coil 156, the brake armature plate 144 is magnetically attracted thereto and moves axially toward the pole 160, the biasing force of the brake springs 148 being overcome so that the clamping force being applied to the second pre-assembled disc stack 140 by the brake springs 148 is relieved. Accordingly, the worm shaft 112 becomes disengaged with the brake mounting plate 130. In this respect, the working air gap 158 and the necessary amount of inter-disc distance are predetermined with respect to the preset tolerance of the predetermined cross-section of the second pre-assembled disc stack 140 so that the two sets of annular discs 56', 58' are rotatively independent when the secondary electromagnetic coil 156 is energized. An electric feed through 162 is provided through the brake housing 136 to provide connection of the secondary electromagnetic coil 156 to a source of electricity. As in the primary electromagnetic coil 90, oil is permitted to circulate about the secondary electromagnetic coil 156 to assist in heat dissipation.

To ensure proper operation of the second pre-assembled disc stack 140, a centrifugal oil pump 164 is connected with the brake hub 134. As in the pre-assembled disc stack 54, the second pre-assembled disc stack 140 may be adjusted as described hereinabove to provide a desired torque transference between the two sets of annular discs 56', 58'. The brake 138 is assembled with the second pre-assembled disc stack 140 being placed therein as a unit analogously as described with respect to the clutch 52, except in particular that there is no thrust plate and there are no lugs to be interfaced with the second pre-assembled disc stack. The shoulder bolts 146 capture the brake armature plate 144 and the brake springs 148, so that these may be assembled as a sub-assembly.

E. The Manual Over-ride Assembly

The manual over-ride assembly 20 includes a manual release mechanism 166 which is connected with the brake housing 136. The manual release mechanism is composed of a socket head bolt 168 which passes through the brake housing 136 and has eccentrically mounted thereto a release plate 170 having a rounded contour. The release plate 170 is held fixed to the socket head bolt 168 by two machined flats, and an O-ring is employed to prevent oil leakage out of the brake housing 136 The rounded contour of the release plate 170 contacts the brake armature plate 144. Rotation of the socket head bolt 136 to a first position results in the release plate 170 being disengaged from biasing against the brake armature plate 144. Rotation of the socket head bolt 136 to a second position results in the release plate 170 biasing against the brake armature plate 144 so as to overcome the biasing force of the brake springs 148 and thereby releasing clamping pressure of the brake armature plate 144 on the second pre-assembled disc stack 140. Accordingly, in this second position of the socket head bolt 168, the worm gear 112 is free to turn. The second position of rotation of the socket head bolt is preferred to be prevented by a stop, such as for example a boss on the socket head bolt striking an abutment on the brake housing, from being at a location in which the eccentric axis of the release plate 170 is aligned with respect to the socket head bolt and the brake armature plate 144; that is, upon release of turning pressure on the socket head bolt, the force of the brake springs 148 will cause the socket bolt head to automatically rotate back to the first position, and thereby deactivate release of the brake 138.

The over-ride assembly 20 further includes a crank mechanism 172 for permitting manual operation of the two-speed drive 10. In this regard, the brake hub 134 is provided with an extension shaft 134b which has an end 134c which extends out of the brake housing 136. The extension shaft 134b is rotatably supported with respect to the brake housing 136 by bearings 172, and an oil seal 174 therebetween prevents oil leakage. A crank (not shown) is connected with the extension shaft end 134c so that a user, after releasing the brake 138 by use of the manual release mechanism 166, the worm gear 112 may be manually rotated as long as the brake remains released.

F. Operation

Operation of the two-speed drive 10 will now be described, with reference being had particularly to FIG. 10.

To operate the two speed drive 10 in high speed mode, the primary motor and primary electromagnetic coil of the clutch are energized. In this manner, the primary drive motor directly drives an external position movement apparatus with the primary clutch shaft spinning independently of the secondary clutch shaft, since the first and second sets of annular discs of the pre-assembled disc stack 54 are uncoupled. As indicated by numeral 176 in FIG. 10, in the high speed mode the secondary electromagnetic coil would not be energized, nor would the secondary drive motor.

To switch from high speed mode to low speed mode as a predetermined positional location is neared by the external position movement apparatus, the primary drive motor and the primary electromagnetic coil are de-energized, thereby resulting in the two sets of annular discs of the pre-assembled disc stack 54 to be coupled, and thereby engaging the primary clutch shaft with the secondary clutch shaft. As indicated by numeral 178 in FIG. 10, the secondary electromagnetic c is energized (initially, this may be in a pulsed manner if needed to rapidly reduce speed to match that of the slow speed mode) and the secondary drive motor is energized. Thus, the brake is released by operation of the secondary electromagnetic coil, and the secondary drive motor drives through the worm and worm gear, through the clutch to the output shaft (the primary drive motor turning freely).

To engage the brake, the secondary drive motor and the secondary electromagnetic coil are de-energized, causing the two sets of annular discs of the second pre-assembled disc stack 140 to couple and thereby stop rotation of the worm shaft, and through the clutch, rotation of the output shaft.

During set-up or in the event of a power failure, the brake may be over-ridden by rotation of the socket head bolt so that the brake armature plate is axially moved so as to relieve spring bias force on the second pre-assembled disc stack 140. The crank may now be rotated so as to turn the worm shaft and, through the clutch, the output shaft.

Since the primary and secondary drive motors and the primary and secondary electromagnetic coils all operate from a source of electricity, in the event of a power failure, the clutch and the brake automatically engage, thereby preventing potential operator injury or apparatus damage.

It is preferred for the primary drive motor to be wired so as to be energized only when the primary electromagnetic coil is energized. This can be provided, for example by employing a parallel -circuit controlled by a switch that simultaneously energizes both the primary drive motor and the primary electromagnetic coil. This feature ensures that the primary drive motor will operate without interference from any other component of the two-speed drive 10, as the clutch will be always disengaged when the primary drive motor is energized. The secondary drive motor is also preferred to be wired in parallel with respect to the secondary electromagnetic coil and be controlled by a single switch so that the secondary drive motor is simultaneously energized with the secondary electromagnetic coil (thus preventing the brake from actuating when the secondary drive motor is energized). Parallel wiring as described has the potential to save much material and labor cost in the installation of the two-speed drive 10, as electrical connections and wiring are minimized.

To those skilled in the art to which this invention appertains, the above described preferred embodiment may be subject to change or modification. For instance, while the pre-assembled disc stack according to the present invention has been exemplified environmentally with use in a two-speed drive incorporating a brake and clutch combination, the pre-assembled disc stack can be used with a clutch, brake or another combination thereof. Further, while an oil shear operated pre-assembled disc stack is preferred, certain installations may be better served by substituting dry friction disc stacks for these components. In such a case, the Specification and Drawing remain effective to fully show this assembly and structure, although components to supply and move oil would be dispensed with. More specifically relative to utilization of dry friction type of pre-assembled disc stacks in the two-speed drive 10, the first and second sets of annular disks 56, 56', 58, 58' and the alignment pins 62, 62' have the same structure and interrelationship as described in the specification and indicated in the Drawing. Further in this regard, the pre-assembled disc stack according to the present invention may be used with respect to an electromagnetic actuation system, an air or pneumatic actuation system, or another form of actuation system known to those of ordinary skill in the art, Such change or modification can be carried out without departing from the scope of the invention, which is intended to be limited only by the scope of the appended claims.

What is claimed is:

1. A pre-assembled disc stack structured for use in a device selected from at least one of a clutch, a brake and a combination thereof, said pre-assembled disc stack having a predetermined cross-section within a first preset tolerance, said pre-assembled disc stack comprising:
- a first set of annular discs, each annular disc of said first set of annular discs having at least one first thickness within at least one second preset tolerance;
- a second set of annular discs, each annular disc of said second set of annular discs having at least one second thickness within at least one third preset tolerance, said second set of annular discs being interleaved with said first set of annular discs in a prearranged order such that said at least one first thickness of each annular disc of said first set of annular discs and said at least one second thickness of each said annular disc of said second set of annular discs cumulatively equals the predetermined cross-section within the first preset tolerance; and
- alignment pin means connected with said second set of annular discs for capturing each annular disc of said second set of annular discs and for capturing each annular disc of said first set of annular discs so as to provide the pre-assembled disc stack having the predetermined cross-section within the first preset tolerance;
- wherein each annular disc of said first set of annular discs has a first inner substantially circular periphery and a first outer substantially circular periphery, wherein further each annular disc of said second set of annular discs has a second inner substantially circular periphery and a second outer substantially circular periphery, said first inner periphery defining a first diameter, said second inner periphery defining a second diameter, said first diameter being less than said second diameter, said first outer periphery defining a third diameter, said second outer periphery defining a fourth diameter, said third diameter being less than said fourth diameter; and wherein said alignment pin means comprises:
- a plurality of alignment pins, each alignment pin of said plurality of alignment pins having a first end and an opposite second end; and
- abutment means located at said first end and said second end of each said alignment pin for providing an abutment at each of said first and second end thereof;
- wherein each annular disc of said second set of annular discs is provided with a plurality of circumferentially disposed alignment holes, an alignment pin of said plurality of alignment pins extending through each alignment hole of said plurality of alignment holes, said first and second sets of annular discs being captured on said plurality of alignment pins by said abutment means; and
- wherein said abutment means comprises a head located at said first end of each said alignment pin and a plurality of double threaded nuts a double threaded nut of said plurality of double threaded nuts being threadably engaged with said second end of each said alignment pin; wherein further, said second set of annular discs is connected with respect to the second component of the device by said plurality of double threaded nuts threadably engaging with respect to the second component.

2. The pre-assembled disc stack of claim 1, further comprising a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins.

3. The pre-assembled disc stack of claim 1, wherein said pre-assembled disc stack is structured for being mounted in a device having a first component rotatable with respect to a second component thereof, wherein the first component of the device is provided with splines; wherein further said first inner periphery is provided with a plurality of teeth for engaging the splines of the first component.

4. The pre-assembled disc stack of claim 3, wherein the second component of the device is provided with a plurality of lugs; wherein further said second outer periphery is provided with a plurality of notches for engaging with the lugs of the second component.

5. The pre-assembled disc stack of claim 1, wherein said first and second sets of annular discs are structured to provide a dry friction type disc stack.

6. The pre-assembled disc stack of claim 1, wherein said first and second sets of annular discs are structured to provide an oil shear type disc stack.

7. A device selected from at least one of a clutch, a brake and a combination thereof, said device comprising:
   a housing;
   a first component connected with said housing;
   a second component connected with said housing so as to be rotatable with respect to said first component;
   a pre-assembled disc stack having a predetermined cross-section within a first preset tolerance said pre-assembled disc stack comprising;
      a first set of annular discs, each annular disc of said first set of annular discs having at least one first thickness within at least one second preset tolerance;
      a second set of annular discs, each annular disc of said second set of annular discs having at least one second thickness within at least one third preset tolerance, said second set of annular discs being interleaved with said first set of annular discs in a prearranged order such that said at least one first thickness of each annular disc of said first set of annular discs and said second at least one thickness of each said annular disc of said second set of annular discs cumulatively equals the predetermined cross-section within the first preset tolerance; and
      alignment pin means connected with said second set of annular discs for capturing each annular disc of said second set of annular discs and for capturing each annular disc of said first set of annular discs so as to provide the pre-assembled disc stack having the predetermined cross-section within the first preset tolerance;
   first connection means for connecting said first set of annular discs with said first component, wherein said first set of annular discs is nonrotatable with respect to said first component, wherein further said first set of annular discs is axially slidable with respect to said first component;
   second connection means for connecting said second set of annular discs with said second component, wherein said second set of annular discs is nonrotatable with respect to said second component, wherein further said second set of annular discs is axially slidable with respect to said second component; and
   biasing means connected with said housing for selectively biasing said first set of annular discs with respect to said second set of annular discs to thereby regulate relative rotation between said first component and said second component;
   wherein each annular disc of said first set of annular discs has a first inner substantially circular periphery and a first outer substantially circular periphery, wherein further each annular disc of said second set of annular discs has a second inner substantially circular periphery and a second outer substantially circular periphery, said first inner periphery defining a first diameter, said second inner periphery defining a second diameter, said first diameter being less than said second diameter, said first outer periphery defining a third diameter, said second outer periphery defining a fourth diameter, said third diameter being less than said fourth diameter; and wherein said alignment pin means comprises:
   a plurality of alignment pins, each alignment pin of said plurality of alignment pins having a first end and an opposite second end; and
   abutment means located at said first end and said second end of each said alignment pin for providing an abutment at each of said first and second end thereof;
   wherein each annular disc of said second set of annular discs is provided with a plurality of circumferentially disposed alignment holes, an alignment pin of said plurality of alignment pins extending through each alignment hole of said plurality of alignment holes, said first and second sets of annular discs being captured on said plurality of alignment pins by said abutment means;
   wherein said abutment means comprises a head located at said first end of each said alignment pin and a plurality of double threaded nuts, a double threaded nut of said plurality of double threaded nuts being threadably engaged with said second end of each said alignment pin; wherein further, said second set of annular discs is connected with respect to the second component of the device by said plurality of double threaded nuts threadably engaging with respect to the second component.

8. The device of claim 7, wherein said first component is a first shaft rotatably connected to said housing and said second component is a second shaft rotatably connected to said housing.

9. The device of claim 8, wherein said biasing means comprises an electromagnetically actuated biasing means.

10. The device of claim 7, wherein said first component is a first shaft rotatably connected to said housing and said second component is stationary with respect to said housing.

11. The device of claim 10, wherein said biasing means comprises an electromagnetically actuated biasing means.

12. A two-speed drive, comprising:
a stationary housing;
an output shaft;
primary drive means connected with said stationary housing and said output shaft for providing high speed driving of said output shaft;
secondary drive means connected with said stationary housing for providing low speed driving of said output shaft;
clutch means connected with said primary drive means and said secondary drive means for selectively engaging said secondary drive means to said output shaft, said clutch means comprising:
a first pre-assembled disc stack having a first predetermined cross-section within a first preset tolerance, said first pre-assembled disc stack comprising:
a first set of annular discs, each annular disc of said first set of annular discs having at least one first thickness within at least one second preset tolerance, said first set of annular disks being connected with said primary drive means so as to be rotatable therewith and axially slidable with respect thereto;
a second set of annular discs, each annular disc of said second set of annular discs having at least one second thickness within at least one third preset tolerance, said second set of annular discs being connected with said secondary drive means so as to be rotatable therewith and axially slidable with respect thereto, said second set of annular discs being interleaved with said first set of annular discs in a prearranged order such that said at least one first thickness of each annular disc of said first set of annular discs and said at least one second thickness of each said annular disc of said second set of annular discs cumulatively equals the first predetermined cross-section within the first preset tolerance;
first alignment pin means connected with said second set of annular discs for capturing each annular disc of said second set of annular discs and for capturing each annular disc of said first set of annular discs so as to provide the pre-assembled disc stack having the first predetermined cross-section within the first preset tolerance; and
first biasing means connected with said stationary housing for selectively biasing said first set of annular discs with respect to said second set of annular discs so as to selectively clamp said first set of annular discs with respect to said second set of annular discs, thereby engaging said secondary drive means with respect to said primary drive means; and
brake means connected with said stationary housing means and said secondary drive means for selectively engaging said secondary drive means with respect to said stationary housing, and, in combination with sash clutch means, for selectively engaging said primary drive means with respect to said stationary housing, said brake means comprising:
a second pre-assembled disc stack having a second predetermined cross-section within a fourth pre set tolerance, said second pre-assembled disc stack comprising:
a third set of annular discs, each annular disc of said third set of annular discs having at least one third thickness within at least one fifth preset tolerance, said third set of annular disks being connected with said secondary drive means so as to be rotatable therewith and axially slidable with respect thereto;
a fourth set of annular discs, each annular disc of said fourth set of annular discs having at least one fourth thickness within at least one sixth preset tolerance, said fourth set of annular discs being connected with said stationary housing so as to be nonrotatable therewith and axially slidable with respect thereto, said fourth set of annular discs being interleaved with said third set of annular discs in a prearranged order such that said at least one third thickness of each annular disc of said third set of annular discs and said at least one fourth thickness of each said annular disc of said fourth set of annular discs cumulatively equals the second predetermined cross-section within the fourth preset tolerance;
second alignment pin means connected with said fourth set of annular discs for capturing each annular disc of said fourth set of annular discs and for capturing each annular disc of said third set of annular discs so as to provide the second pre-assembled disc stack having the second predetermined cross-section within the fourth preset tolerance; and
second biasing means connected with said stationary housing for selectively biasing said third set of annular discs with respect to said fourth set of annular discs so as to selectively clamp said third set of annular discs with respect to said fourth set of annular discs, thereby engaging said secondary drive means and, selectively through said clutch means, said primary drive means with respect to said stationary housing.

13. The two-speed drive of claim 12, wherein said secondary drive means comprises a secondary electric motor, said secondary electric motor being electrically wired with respect to said brake means so that energization of said secondary motor also effects disengagement of said secondary drive means with respect to said stationary housing; and wherein said primary drive means comprises a primary electric motor, said primary electric motor being electrically wired with respect to said clutch means so that energization of said primary motor also effects engagement of said secondary drive means with respect to said output shaft.

14. The two-speed drive of claim 12, wherein said first and second alignment pin means comprise:
a plurality of first alignment pins, each first alignment pin of said plurality of first alignment pins having a head at a first end thereof and a threaded opposite end;
a plurality of first double threaded nuts, a first double threaded nut being threadably engaged on said threaded opposite end of each said first alignment pin;
a plurality of second alignment pins, each second alignment pin of said plurality second of alignment pins having a head at a first end thereof and a threaded opposite end; and a plurality of second double threaded nuts, a second double threaded nut being threadably engaged on said threaded opposite end of each said second alignment pin;

wherein each annular disc of said first set of annular discs has a first inner substantially circular periphery and a first outer substantially circular periphery, wherein each annular disc of said second set of annular discs has a second inner substantially circular periphery and a second outer substantially circular periphery, said first inner periphery defining a first diameter, said second inner periphery defining a second diameter, said first diameter being less than said second diameter, said first outer periphery defining a third diameter, said second outer periphery defining a fourth diameter, said third diameter being less than said fourth diameter; and further wherein each annular disc of said second set of annular discs is provided with a plurality of circumferentially disposed first alignment holes, a first alignment pin of said plurality of first alignment pins extending through each first alignment hole of said plurality of first alignment holes, said first and second sets of annular discs being captured between said head and said double threaded nut of each said first alignment pin; and wherein each annular disc of said third set of annular discs has a third substantially circular inner periphery and a third outer substantially circular periphery, wherein further each annular disc of said fourth set of annular discs has a fourth inner substantially circular periphery and a fourth outer substantially circular periphery, said third inner periphery defining a fifth diameter, said fourth inner periphery defining a sixth diameter, said fifth diameter being less than said sixth diameter, said third outer periphery defining a seventh diameter, said fourth outer periphery defining an eighth diameter, said seventh diameter being less than said eighth diameter; and further wherein each annular disc of said fourth set of annular discs is provided with a plurality of circumferentially disposed second alignment holes, a second alignment pin of said plurality of second alignment pins extending through each second alignment hole of said plurality of second alignment holes, said third and fourth sets of annular discs being captured between said head and said double threaded nut of each said second alignment pin.

15. The two-speed drive of claim 14, further comprising a plurality of first wave washers wherein each annular disc of said second set of annular discs is separated from each adjacent annular disc of said second set of annular discs by a respective set of first wave washers, one first wave washer of said respective set of first wave washers being carried on each said first alignment pin; wherein further, each annular disc of said fourth set of annular discs is separated from each adjacent annular disc of said fourth set of annular discs by a respective set of second wave washers, one second wave washer of said respective set of second wave washers being carried on each second alignment pin.

16. The two-speed drive of claim 14, wherein said clutch means further comprises:

a primary clutch shaft rotatably mounted to said stationary housing and connected with said primary drive means, said primary clutch shaft being provided with splines; and a secondary clutch shaft rotatably mounted to said stationary housing and connected with said secondary drive means, said secondary clutch shaft being provided with a plurality of lugs oriented parallel with respect to said secondary clutch shaft;

wherein said first inner periphery is provided with a plurality of teeth for engaging said splines of said primary clutch shaft, and said second outer periphery is provided with a plurality of notches for engaging said plurality of lugs of said secondary clutch shaft.

17. The two-speed drive of claim 16, wherein said first biasing means comprises:

a thrust plate having a first clutch thrust surface for abutably contacting one side of said first pre-assembled disc stack;

a second clutch thrust surface connected with said secondary clutch shaft for abutably contacting a side of said first pre-assembled disc stack opposite with respect to said one side thereof;

a clutch armature plate having a coil face portion constructed of a magnetic material, said clutch armature plate being rotatably connected with said thrust plate for transmitting force on said clutch armature plate axially with respect to said primary clutch shaft to said thrust plate;

a plurality of clutch springs, said stationary housing being provided with a plurality of clutch spring cavities for locating each clutch spring of said plurality of clutch springs in a respective clutch spring cavity;

a plurality of shoulder bolts, a shoulder bolt being anchored in each of said clutch spring cavities, said armature plate being slidably connected with said plurality of shoulder bolts so as to be slidable axially with respect to said primary clutch shaft; and clutch electromagnetic coil means comprising a primary electromagnetic coil, said clutch electromagnetic coil means being connected with said stationary housing for magnetically attracting said coil face portion of said clutch armature plate in response to energization of said primary electromagnetic coil;

wherein said plurality of clutch springs bias said clutch armature plate against said thrust plate, thereby causing said first and second clutch thrust surfaces to bias against said first pre-assembled disc stack so as to clamp said first set of annular discs with respect to said second set of annular discs;

wherein further, energization of said primary electromagnetic coil magnetically attracts said clutch armature plate so as to relieve said biasing of said thrust plate against said first pre-assembled disc stack.

18. The two-speed drive of claim 17, wherein said connection of said secondary clutch shaft to said secondary drive means comprises gear reduction means rotatably connected with said stationary housing and drivably connected to said secondary drive means and said secondary clutch shaft for transmitting gear reduced rotation from said secondary drive means to said secondary clutch shaft.

19. The two-speed drive of claim 18, wherein said brake means further comprises:

a brake hub connected with said gear reduction means for rotating with said secondary drive means, said brake hub being provided with splines; and threaded seat means in said stationary housing for threadably receiving said double threaded nut of each said second alignment pin;

wherein said third inner periphery is provided with a plurality of teeth for engaging said splines of said brake hub, and said double threaded nuts of each of said second alignment pins is threadably received in said threaded seat means.

20. The two-speed drive of claim 19, wherein said second biasing means comprises:

a brake armature plate having a first brake thrust surface for abutably contacting one side of said second pre-assembled disc stack, said brake armature plate being provided with a coil face portion constructed of a magnetic material;

a second brake thrust surface connected with said stationary housing for abutably contacting a side of said second pre-assembled disc stack opposite with respect to said one side thereof;

a plurality of brake springs, said stationary housing being provided with a plurality of brake spring cavities for locating a brake spring of said plurality of brake springs in a respective brake spring cavity;

a plurality of shoulder bolts, a shoulder bolt being anchored in each of said brake spring cavities, said armature plate being slidably connected with said plurality of shoulder bolts so as to be slidable axially with respect to said brake hub; and brake electromagnetic coil means comprising a secondary electromagnetic coil, said brake electromagnetic coil means being connected with said stationary housing for magnetically attracting said coil face portion of said brake armature plate in response to energization of said secondary electromagnetic coil;

wherein said plurality of brake springs bias said brake armature plate against said second pre-assembled disc stack thereby causing said first and second brake thrust surfaces to bias against said second pre-assembled disc stack so as to clamp said third set of annular discs with respect to said fourth set of annular discs; wherein further, energization of said secondary electromagnetic coil magnetically attracts said brake armature plate so as to relieve said biasing of said brake armature plate against said second pre-assembled disc stack.

21. The two-speed drive of claim 20, wherein said secondary drive means comprises a secondary electric motor, said secondary electric motor being electrically wired with respect to said brake electromagnetic coil means so that energization of said secondary motor also effects energization of said secondary electromagnetic coil; and wherein said primary drive means comprises a primary electric motor, said primary electric motor being electrically wired with respect to said clutch electromagnetic coil means so that energization of said primary motor also effects energization of said primary electromagnetic coil.

22. The two speed drive of claim 21, further comprising manual over-ride means connected with said stationary housing for providing selective release of said biasing of said second biasing means with respect to said third and fourth sets of annular discs.

23. The two-speed drive of claim 22, wherein said manual over-ride means further comprises crank means connected with said brake hub for providing manual driving of said output shaft while said second biasing means is released in response to said selective rotation of said bolt means.

24. The two-speed drive of claim 23, wherein said first and second sets of annular discs are structured to provide a dry friction type disc stack.

25. The two-speed drive of claim 24, wherein said first and second sets of annular discs are each structured to provide an oil shear type disc stack; wherein said clutch means further comprises first oil means for supplying oil to said first pre-assembled disc stack; wherein further, said brake means further comprises second oil means for supplying oil to said second pre-assembled disc stack.

* * * * *